United States Patent Office.

PHILO B. SHELDON, OF BATH, NEW YORK.

Letters Patent No. 86,873, dated February 9, 1869.

IMPROVED COMPOUND FOR DESTROYING INSECTS.

The Schedule referred to in these Letters Patent and making part of the same

Be it known that I, PHILO B. SHELDON, of Bath, in the county of Steuben, and State of New York, have invented a new and useful Compound for the Purpose of Destroying Insects that infest fruit and ornamental trees, also as a fertilizer for trees and plants; and I do hereby declare that the following is a full and exact description thereof.

My invention is designed to act as a preventive to the maturing of insects, by destroying the eggs or larvæ deposited on the trunks of trees, which, if left to hatch, feed upon the bark, body, foliage, or fruit.

This compound consists of four pounds of common hard soap, one pound of chloride of sodium, four ounces of sulphate of iron, two ounces sulphate of copper, two ounces sal-soda, one ounce nitre, and two ounces of pulverized charcoal.

I dissolve the hard soap in water, over a slow fire. I also dissolve the chloride of sodium, sulphate of iron, sulphate of copper, sal-soda, and nitre, in a separate vessel, to which I add the charcoal-powder. When the soap is all dissolved, so as to mix freely, I mix all the ingredients in one vessel.

The proportions may be varied to some extent, without materially destroying the effect, but I prefer to use them in about the relative quantities above stated, as securing the best result.

The compound is applied, as a wash, with an old broom or brush, scrubbing the entire trunk and large limbs as far as is convenient. In this manner of application, every part of the trunk becomes saturated with the wash, in this way coming in contact with the eggs or larvæ of insects, whereby they are effectually destroyed.

Care should be taken in washing, so that no part of the trunk of the tree shall escape a thorough saturation.

To accomplish this object more effectually, it would be well to scrape the tree, to relieve it of rough scales of bark and moss, under which eggs are deposited. By the destruction of the eggs and larvæ, reproduction ceases, and the evil is removed.

The nature of the compound, used as a wash, is favorable to the growth and healthy condition of the tree, and serves to soften and benefit the bark, while, in becoming absorbed in the soil around the roots, it is a valuable fertilizer.

The application should be repeated at intervals during the season of insect life, to insure complete success.

As a fertilizer, it may be used by saturating the earth about the roots of trees, or where seed is to be planted, both before and after planting.

What I claim as my invention, and desire to secure by Letters Patent, is—

Combining and employing the ingredients herein described, in substantially the method and proportions set forth, for the purpose of destroying insects that infest fruit and ornamental trees, also for promoting the growth of trees and plants, or any other combination of the same materials.

PHILO B. SHELDON.

Witnesses:
L. P. HARD,
HENRY FAUCETT.